UNITED STATES PATENT OFFICE.

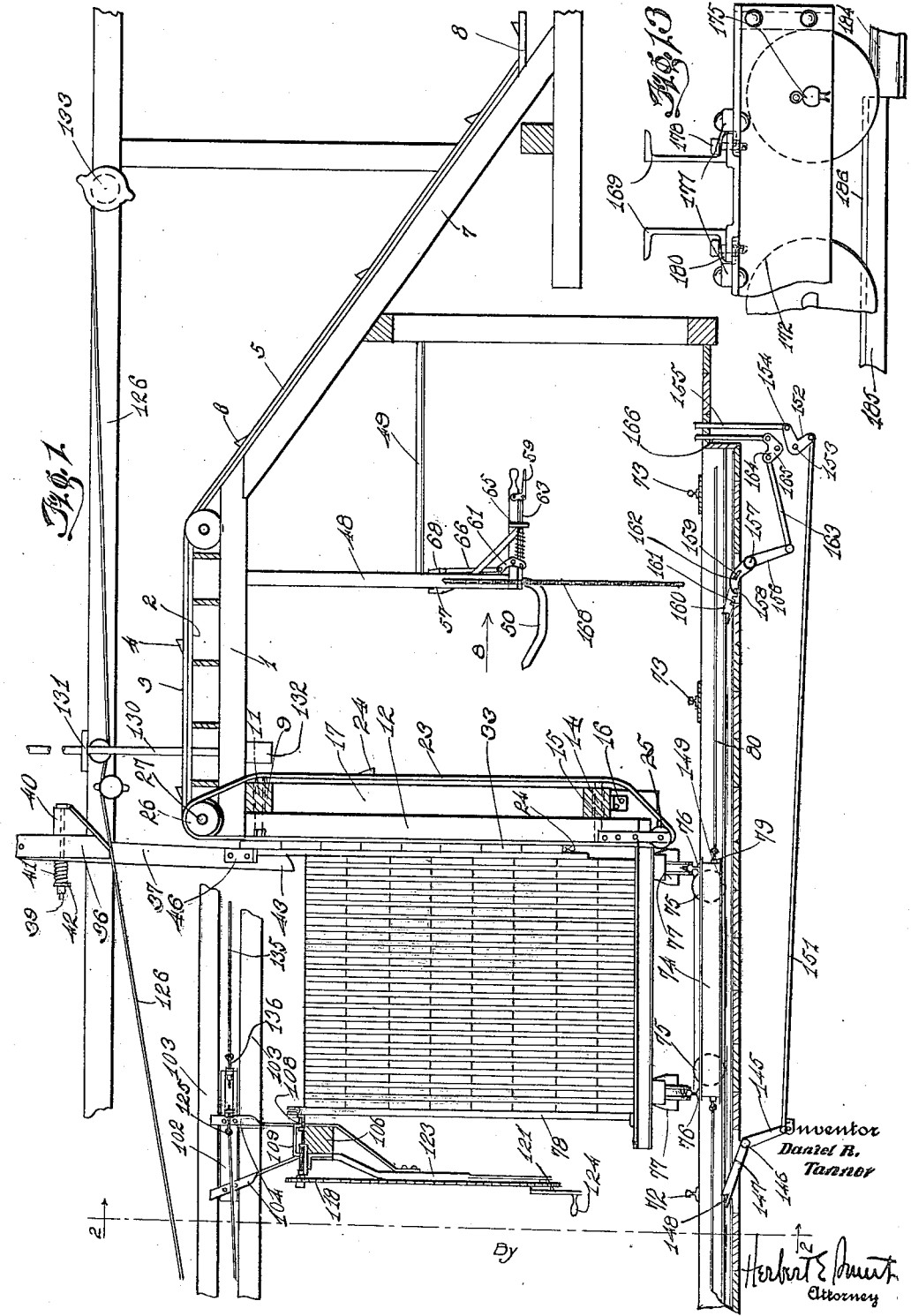

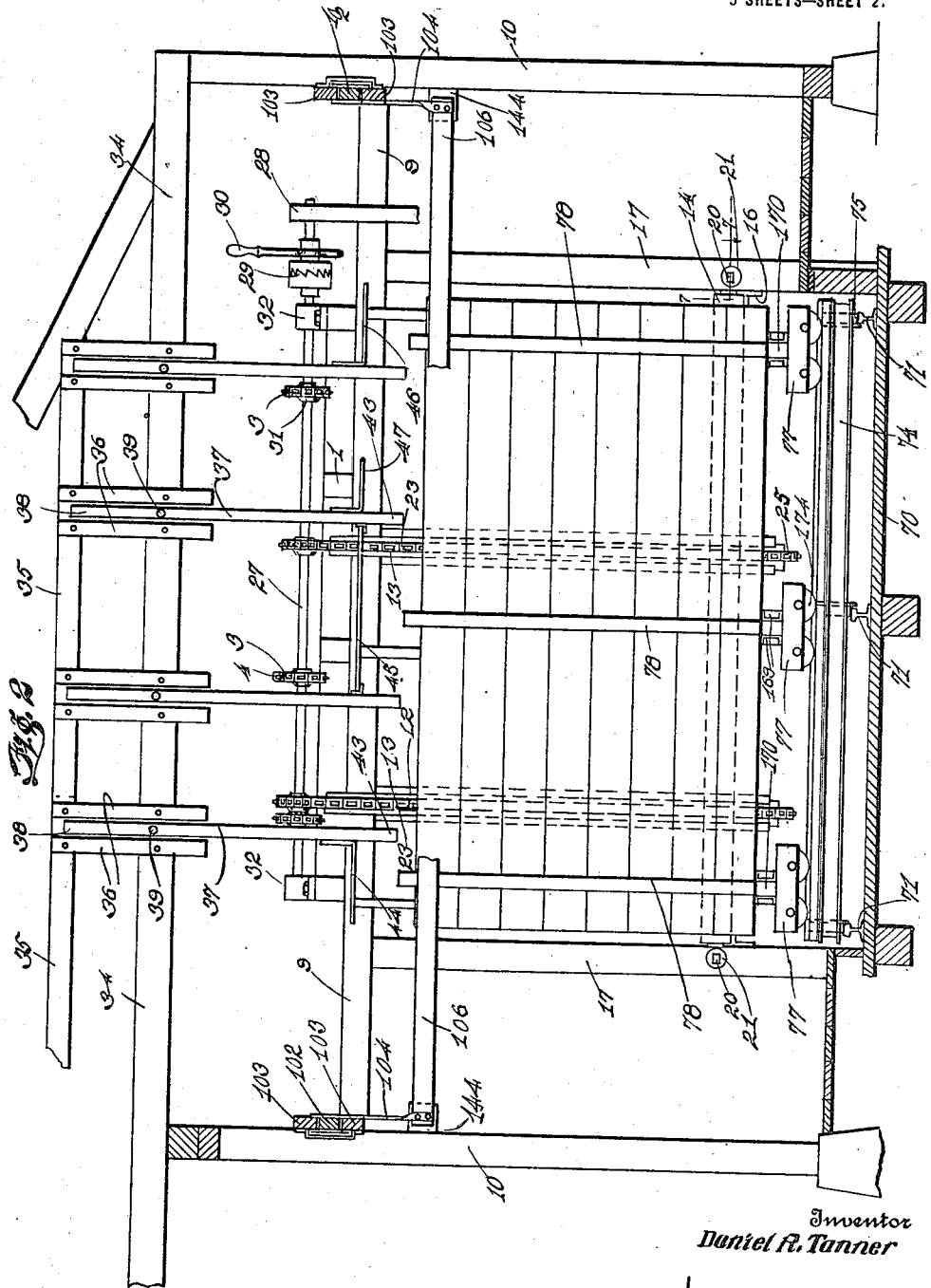

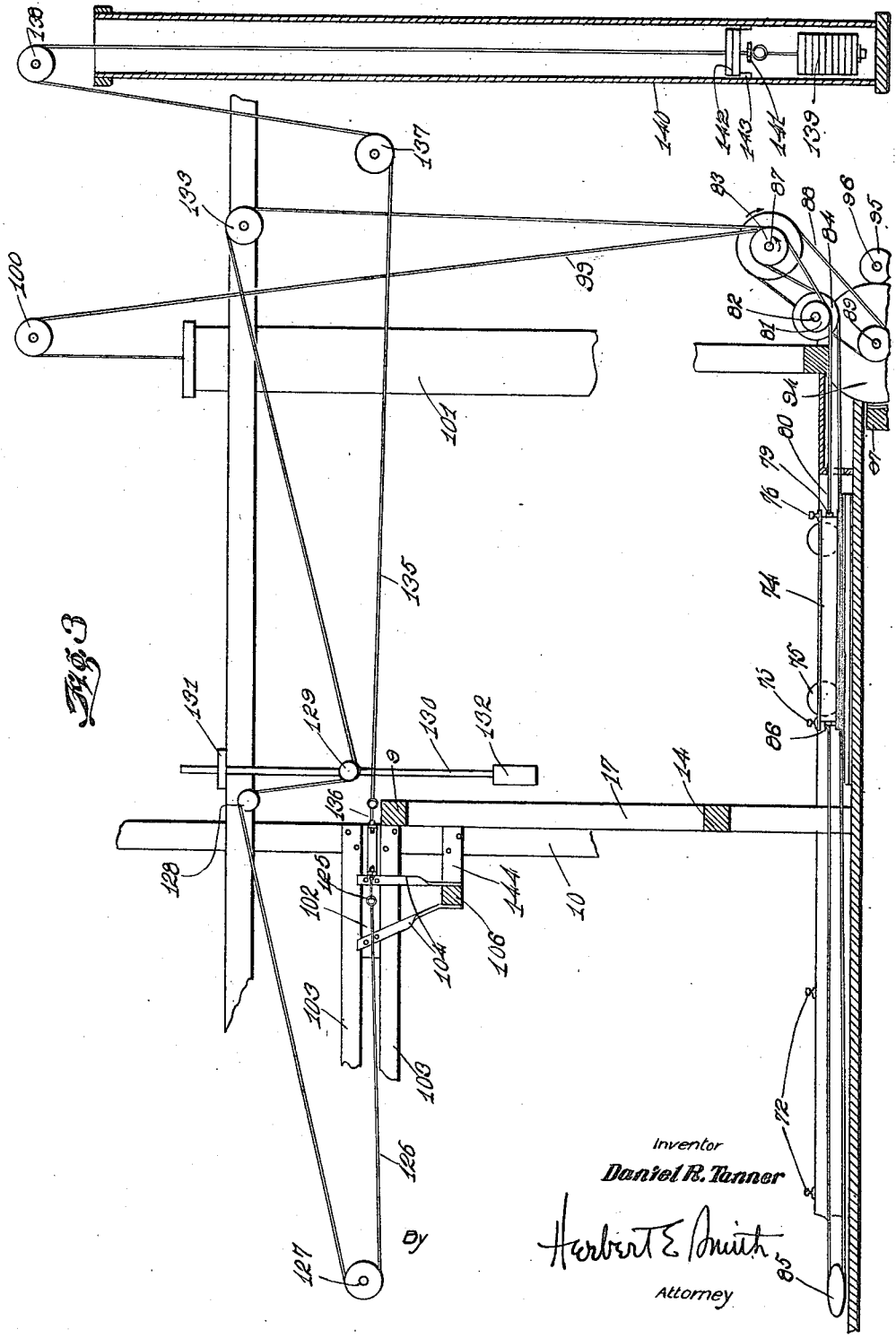

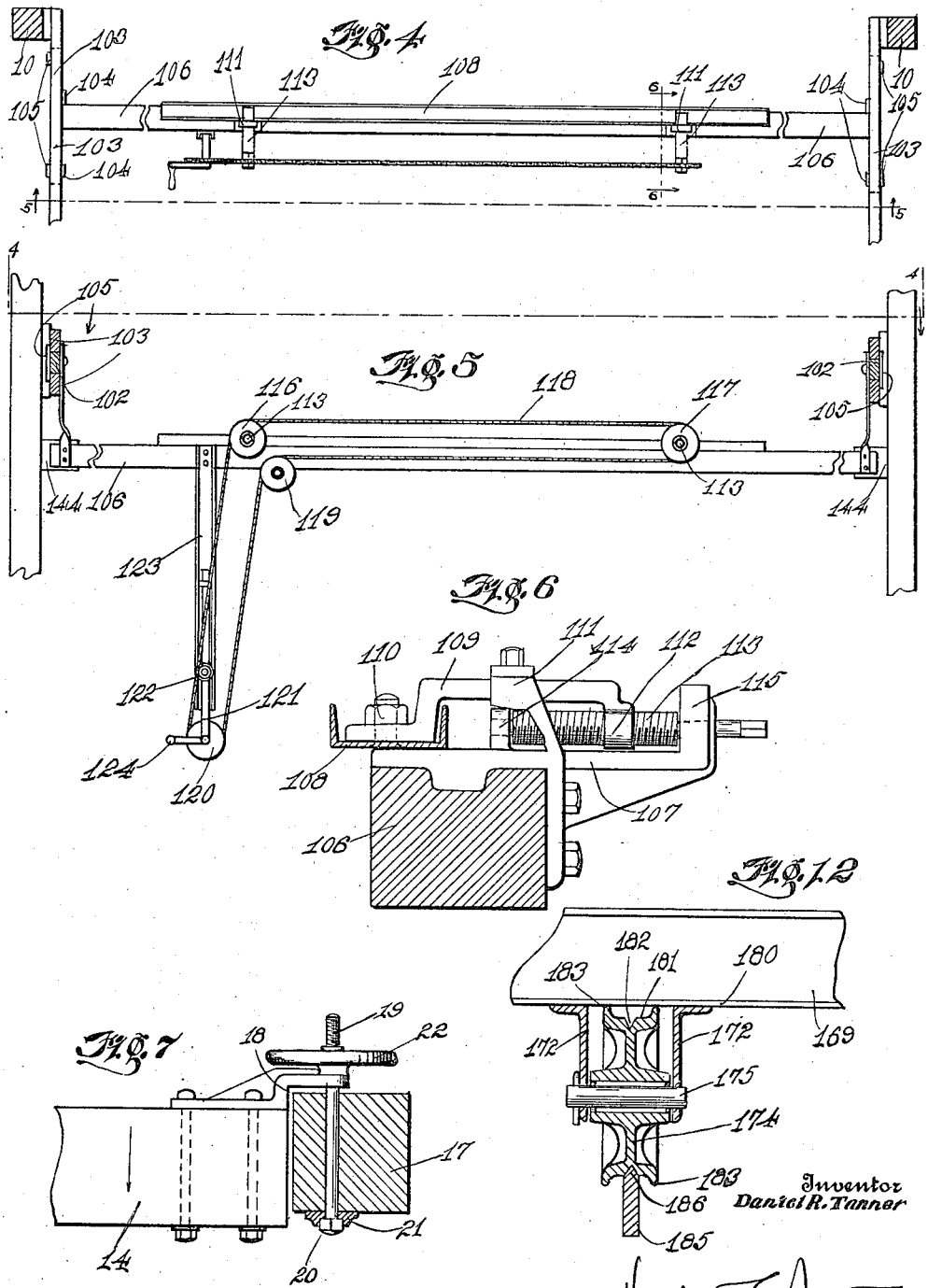

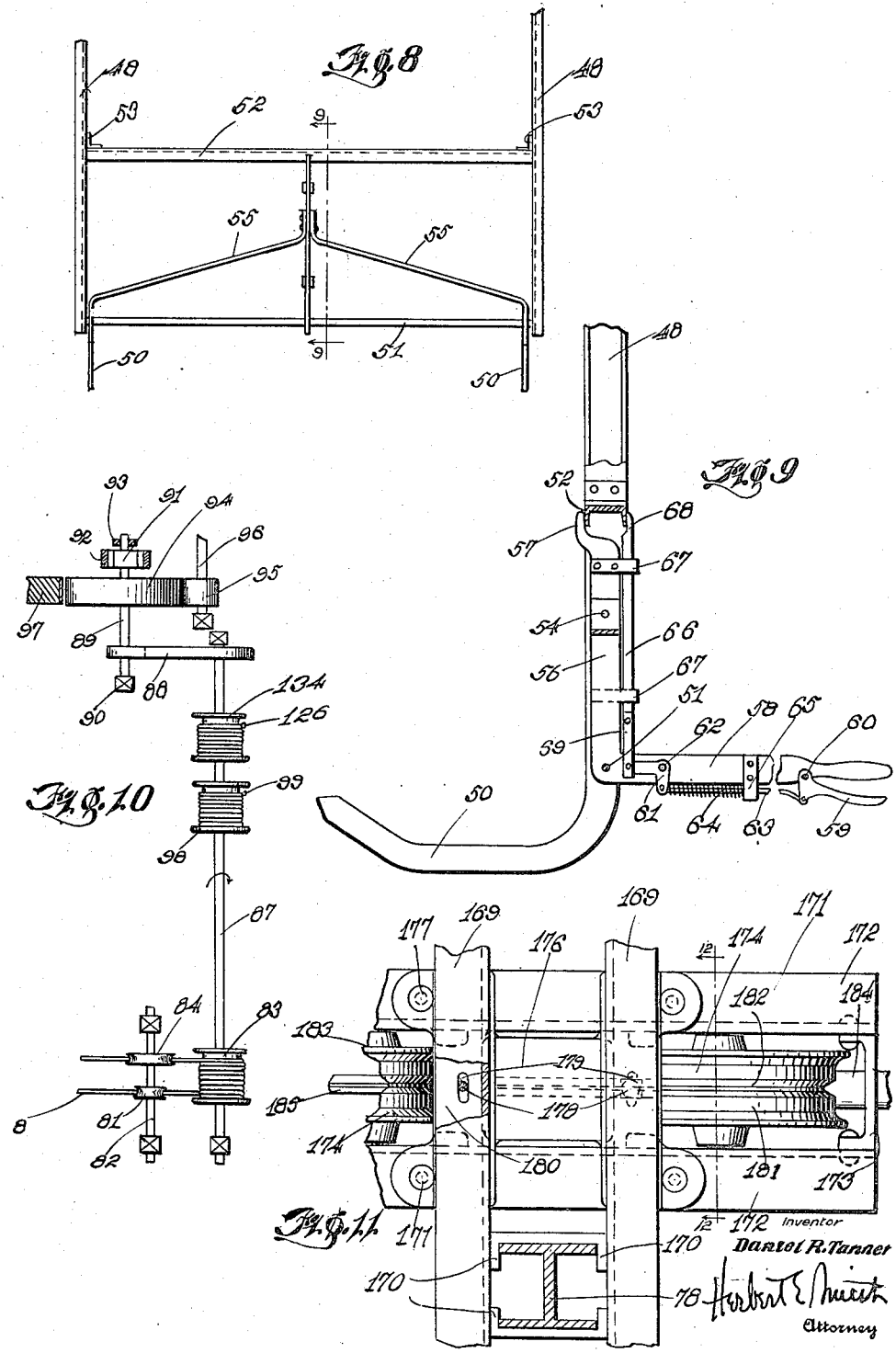

DANIEL R. TANNER, OF LA GRANDE, OREGON.

LUMBER-UNLOADING MECHANISM.

1,220,375.  Specification of Letters Patent.  Patented Mar. 27, 1917.

Application filed September 21, 1915.  Serial No. 51,824.

*To all whom it may concern:*

Be it known that I, DANIEL R. TANNER, a citizen of the United States, residing at La Grande, in the county of Union and State of Oregon, have invented certain new and useful Improvements in Lumber-Unloading Mechanisms, of which the following is a specification.

This invention relates to improvements in lumber handling machinery and it has to do more particularly with improvements in lumber unloaders especially adapted for unloading lumber from a carrier in edge stacked form.

One of the principal objects of this invention is to provide an unloader and carrier in which the latter is capable of being advanced, through, past or under the unloader as its load is being removed by the unloader. In this connection, it is an important feature to provide a transfer car which is movable to opposite sides of the unloader into registry with incoming and outgoing transport tracks so that a lumber carrier may be advanced on its own wheels, onto the transfer car from the incoming tracks, unloaded, and finally advanced on its own wheels in a lumber empty condition from the transfer car onto the outgoing transport tracks.

It is a further object of this invention to provide means for exerting a substantially constant advancing thrust, preferably on both the carrier and its load, to move the latter into and hold the same in practically a constant and sustained pressure engagement against the unloader throughout the unloading operation. In the most preferred embodiment, such thrust is capable of advancing the car, after the same has been unloaded, to a final position where the empty car or carrier may be advanced off from the transfer car, on its own wheels, along the outgoing transport tracks.

In connection with this improved thrust exerting means, it is a feature of my invention to provide stops for the carrier structure, or more particularly speaking, the transfer car, whereby the latter may be arrested from action by such thrust when in proper registry with the incoming transport tracks, and whereby said transfer car may be arrested when the unloading operation has been about completed in order to permit of removal of the rear stakes to afford passage of the carrier past the unloader and into a final position.

My invention more specifically includes cable means for advancing the lumber carrying structure and a load pressure beam in unison, up to a loading position and during the unloading operation, the said means serving to advance the lumber carrying structure after the beam has completed its function and also retracting the beam and lumber carrying structure to a starting position. The cable means is actuated by weight mechanism and power mechanism and one of said mechanisms serves to advance the pressure beam and the carrying structure toward the unloader while the other mechanism serves to retract the carrier structure and pressure beam to a starting position.

A further object of this invention is to provide independent truck units which are entirely stable on their own wheels and which need not and are not knocked down and carried back from the unloading to the loading point but which are run back on their own wheels from the unloading to the loading point. And in this connection, my improved truck units comprise specific features of novelty, one of the most important of which consists in equipping each unit with endwise disposed wheel frames and loosely connecting such wheel frames, preferably loosely, by a transversely disposed bolster.

My invention has other objects and features which will be more fully described in connection with the accompanying drawings and will be more particularly pointed out in and by the appended claims.

In the drawings:—

Figure 1 is a longitudinal vertical sectional view of the unloader apparatus showing a lumber carrying structure in the position which it would assume at the beginning of the unloading operation.

Fig. 2 is a sectional view on line 2—2 of Fig. 1.

Fig. 3 is a diagrammatic view, partly structural, illustrating the disposition of the cable means for advancing and retracting the carrier and the pressure beam.

Fig. 4 is a sectional view on line 4—4 of Fig. 5, showing my improved load pressure beam.

Fig. 5 is a sectional view on line 5—5 of Fig. 4.

Fig. 6 is a sectional view, on an enlarged scale, on line 6—6 of Fig. 4.

Fig. 7 is a sectional view on line 7—7 of Fig. 2 showing an improved adjustment for the unloader.

Fig. 8 is a view in elevation of my improved sticker holder and dumping mechanism looking in the direction of arrow 8, of Fig. 1.

Fig. 9 is a sectional view on line 9—9 of Fig. 8.

Fig. 10 is a plan view of the drum structure and its operating mechanism for actuation of the cable means.

Fig. 11 is a plan view of one of my improved truck units showing the end frame and a portion of the bolster connecting the end frames.

Fig. 12 is a sectional view on line 12—12 of Fig. 11.

Fig. 13 is a side view of one of my improved truck units.

Like characters of reference designate similar parts throughout the different figures of the drawings.

As illustrated, 1 designates a horizontal framework on which a carrier 2 is mounted, chains 3 having lugs 4, being provided to advance the lumber toward inclined chains 5 having lugs 6. The inclined chains run on a framework 7 down to horizontal chains 8, for movement of the lumber which has been unloaded to a final point of disposition. The foregoing structure is not involved in my invention but is illustrated to a sufficient extent to make the operation of my invention clear.

A supporting beam 9, mounted upon uprights 10, serves to support an upright framework of which my unloader in part is formed. To this supporting beam 9 is loosely secured by bolts 11, a plurality of upright skids 12. The bolts 11 extend through the beam 9 with sufficient clearance to permit of adjustment, of a slight nature, of the skids 12. Mounted upon the skids 12 are lifter chain guides 13, which may be in the form of channel irons and against which the load is maintained under pressure engagement during the unloading operation. The skids 12 extend downwardly preferably below and in front of an adjusting beam 14 which is loosely mounted upon the skids 12 by means of bolts 15. Angle iron supports 16 may also be provided to support the beam 14, said angle irons being mounted upon uprights 17. At each end of the adjustable beam 14 I provide an improved adjusting device which will be described more particularly with reference to Fig. 7.

Upon each end of adjusting beam 14 is mounted a rigid adjusting member 18 which extends rearwardly of the upright 17. A bolt 19 extends through the adjusting member 18 and upright 17 and is provided with an enlarged polygonal head 20, seated in a socket 21. An adjusting nut, preferably in the form of a hand wheel 22, is movable upon the threaded end of bolt 19 to advance the adjusting beam 14 in the direction of the arrow, with respect to the upright 17.

Now it will be noted that this adjusting feature does not merely involve adjustment of the beam 14 independently at either end, as it will be noted that the skids 12 are loosely mounted and that they coact with the adjusting beam so that when the latter is adjusted, the upright skeleton frame included in the unloader structure will be adjusted at different angles from a normal plane in order to meet any contingency of irregularity in the plane of the load abutting against the unloader frame. If the plane of the load were absolutely parallel with the plane of the unloader, then no adjustment would be required. However, if one corner of the load projected or receded from the plane of the remainder of the load, then adjustment of one end of the beams 14 will be sufficient to distort the frame of the unloader so as to provide effective engagement of the load against the skids 12, or more particularly speaking, against the channels 13 thereon.

My improved unloader is shown as including endless chains 23, each provided with a pair of tier lifting lugs 24, said chains running about idlers 25, at their lower bights, and driven sprockets 26 at their upper bights. The sprockets 26 are mounted upon a shaft 27, which may be driven in any suitable manner by a belt 28, and which may be clutched or unclutched to and from power connection by a clutch 29 operated by clutch lever 30. The chains 3 are mounted upon sprockets 31, also secured on shaft 27, the latter being journaled in bearings 32. Now it will be understood that the unloader chains will not be started until a load has been placed in position thereagainst as it is necessary to have the lugs 24 in subjacent relation with the first tier of lumber abutting against guides 13. After the load is placed in position, then the clutch 29 is thrown in to start the chains 23. As the foremost tier of lumber, as indicated at 33, is lifted upwardly, it will be deposited board by board, upon chains 3 whereby it will be carried toward the inclined chains 5.

I will next describe a feature of my invention which performs the function of holding those boards of the elevating tier, which are above the load, in flat abutting relation against the lifter chains until they have rounded the wheels 26, this feature being embodied in the form of tension members which also perform the function of arresting upward movement of the stickers.

Mounted upon uprights 10 is a transverse beam 34, and above the same is a beam 35. Guiding members 36, preferably arranged in pairs, are anchored to the beams 34 and 35 and are shown vertically disposed. Between each pair of guiding members is a tension arm 37 whose upper end 38 fulcrums against beam 35. A bolt 39 extends through the tension arm 37 and through a fixed block abutment 40. A spring 41 is interposed between a washer 42 and said arm 37 in such a manner as to cause the lower end 43 of said arm to bear against the boards supporting them in flat abutting relation. The lower end 43 is rounded off so that when the topmost board of the foremost tier is elevated, the lower end 43 will move outwardly so that the boards of the tier can pass up between the chains 23 and said tension arms, the latter holding the boards firmly in position until the boards round over the wheels 26. Any common form of guide, of a gravity acting nature, may be employed if desired to cause the boards to descend to the right of Fig. 1 onto chains 3. I preferably provide a plurality of tension arms 37, all of which are identical in construction and operation, four being shown in Fig. 2. Said tension arms are provided with sticker stops designated at 44, 45, 46, and 47 against which the stickers will abut after traveling upwardly with the tiers to the point indicated in Fig. 1. These sticker abutments thereafter arrest further upward movement of the stickers with their tiers so that when the latter have been completely elevated, the stickers may be removed by hand. When the tiers are completely elevated, it will be seen that the stickers are free to be removed by reason of the fact that the next successive tiers are abutted against the guides 13 which are disposed between the stickers.

At this point it may be opportune to describe my improved sticker holder which permits of a single disposition of the loose stickers during the unloading operation, for final dumping movement of the stickers upon the unloaded carrier.

Referring to Figs. 1, 8 and 9, 48 designates depending hangers which are shown properly braced at 49. Sticker holding and dumping arms 50 are shown mounted upon a pivot rod 51, journaled in the hangers 48. A locking bar 52, preferably of channel form, is anchored at 53 to the depending hangers 48. A locking lever, preferably of bell crank form, is mounted upon the pivot rod 51 and to this lever is secured, at 54, extensions 55 of the sticker arms. The locking lever comprises an arm 56 which is provided with an abutment end 57 for engagement against one side of locking bar 52 to limit movement of arm 56 and said sticker arms 50, to the right, beyond the position shown in Fig. 9. Locking lever 56 is provided with an arm 58 to which a hand grip 59 is pivoted at 60. A bell crank lever 61 is pivoted at 62 on said arm 58 and is connected by rod 63 with said hand grip 59. A spring 64 normally holds the lever and hand grip in the position shown in Fig. 9 and is interposed between lever 61 and a guide 65. A locking rod 66 is movable in guides 67, mounted on arm 56, into and out of engagement with the remaining side of locking rod 52, its end 68 being shaped to engage said bar. Said locking bar 66 is connected with bell crank lever 61, by a link 69, so that as bell crank lever 61 is actuated it may retract locking rod 66 and permit the arms 50 to descend and dump the stickers.

Now the main importance of this feature resides in its location in such proximity to the unloader as to permit the loose stickers to be withdrawn and placed in this sticker holder, which is practically within the reach of the operator, and which does not require him to even take a step. A further important feature, as will hereinafter more fully appear, is that this sticker holder is in such superposed relation with respect to an empty carrier that the stickers can be readily dumped upon such carrier after the latter has been unloaded, and when it is in such position as to be advanced, on its own wheels, back to the next point of operation.

I will next describe my improved lumber carrying structure, which in the present construction, comprises a transfer car and a lumber carrier.

A portion of the mill is provided with a slightly sunken floor 70 on which transfer trackage comprising three transfer rails 71 are mounted. Said transfer trackage is shown extending at right angles past the terminals of incoming transport tracks 72 and outgoing transport tracks 73. The transfer car is indicated at 74 and is provided with three pairs of wheels 75 for running on rails 71. Said transfer car 74 is also provided with transport rail sections 76 for registry with transport rails 72 and 73, in either extreme position of the transfer car 74.

My improved lumber carrier comprises a truck structure which is shown formed of independent truck units designated as a whole at 77, three truck units being employed, in the present construction, to make up each carrier. The detailed and specific construction of the truck units will be hereinafter more fully described but it may be stated that provision is made for socketing stakes 78, at the rear and front of the load to hold the load effectively upon the carrier. I preferably employ spring take-up stakes as covered more fully in my application filed January 19, 1915, Serial Number 3,073, for improvement in kiln truck take-up. The carrier, when loaded, is advanced on the incoming transport tracks 72 onto the track sections 76, of the transfer car 34, in any suitable manner, and it may be blocked or locked against movement after it is on the transfer car in the position shown in Fig. 2. After the carrier has been advanced onto the transfer car, it will be necessary to advance the transfer car and its carrier toward the unloader and hold the transfer car, and also desirably the load on the car, in engagement with the unloader by a sustained and gradually advancing thrust. I will therefore next describe the mechanism for performing this function, reference being had more particularly to Figs. 3, 4, 5, 6 and 10.

To the forward end of the transfer car 74 is secured at 79, in any desirable manner, an end 80 of a cable for imparting thrust to the transfer car 74. Said transfer car cable extends under an idler sheave 81, on shaft 82, and is reeved about a drum 83, as shown in Fig. 10. Said cable is reeved onto the drum 83 in one direction and is reeved off from the drum 83 in another direction, thus the point of the cable adjacent one extremity of travel of the car 74 will be reeved about an actuating drum, the latter being indicated at 83. From the actuating drum 83 the cable is reeved onto a sheave 84 which is an idler, mounted on shaft 82. From sheave 84 the cable extends about a sheave 85, adjacent the other extremity of travel of the car, and from said sheave 85 the cable extends to the opposite side of the car 74 where it is secured thereto at 86. Two or more cables may be provided for the car but as all would operate in a similar manner, only one is shown.

When the drum structure 83 is rotated in a contrary clockwise direction, looking at Fig. 3, the transfer car 74 will be advanced to the right of Fig. 3 but when the drum 83 is rotated in a clockwise direction, the transfer car 74 will be retracted to the left of Fig. 3. The apparatus which I am about to describe, is, in the present construction, advanced in one direction by power mechanism and in the other direction by weight or gravity mechanism and I will first describe the manner in which the power and weight mechanism operates the transfer car 74.

All of the drums which are used, will be mounted upon a single drum shaft 87, which, in the claims will be referred to, together with the drums, as the drum structure. The drum shaft 87 is belted at 88 to a power driven shaft 89 which is swiveled in a bearing 90, at one end thereof. The other end of said shaft is mounted in a bearing 91 which is slidable in a support 92. A lever 93, for manual operation, serves to shift shaft 89 to the right or left of Fig. 10. On power driven shaft 89 is mounted a relatively large friction wheel 94 which is adapted for engagement with a driving friction wheel 95, on shaft 96, when said shaft 89 is shifted to the right of Fig. 10. This serves to drive drum structure shaft 87 in a clockwise direction, opposite to the direction indicated by the arrow in Fig. 3. Thus when the drum structure is operated in a clockwise direction, car 74 will be retracted to the left of Fig. 3. When the car 74 has reached one limit of its movement under power drive, then the shaft 89 is shifted to free the friction wheel 94 from the friction wheel 95, and if desired, such movement of the wheel 94 to the left of Fig. 10 may be sufficient to throw wheel 94 into engagement with a fixed brake 97 which will bring the car 74 to a position of rest and hold it in such position. It will be understood, that in any degree of movement of the car 74 to the left of Fig. 3, the car can be advanced by power to any desired point and brought to a position of rest at any desired point.

Now a weight mechanism acts in opposition, or in other words, to rotate the drum structure shaft 87 in a contra-clockwise direction, as indicated by the arrow in Fig. 3.

As shown, a drum 98 is fixed on said shaft 87 and a cable 99 is reeved about said drum in the direction shown in Figs. 3 and 10. Said cable runs over or is trained about an idler sheave 100 and extends down into a casing 101 in which a weight is located which is substantially the same in operation and construction as the weight for the load pressure mechanism which is presently to be described. Thus it will be seen that when the car is shifted under power to a retracted position to the left of Fig. 3, and the wheel 94 is shifted to an intermediate position, then the weight on the cable 99 will be free to act in descent to rotate the drum structure in a contra-clockwise direction and advance the car 74 to the right of Fig. 3. It will also be noted that when the car 74 is advanced to the left of Fig. 3, then the weight in casing 101 will be energized or lifted to the top of said casing so that the weight will always be ready to perform its function when it is desired to shift the car 74 to the right of Fig. 3.

It is a feature of this invention to impart a substantially constant propulsive advancing thrust both to the transfer car or a lumber carrying structure, and to the load carried thereby, and therefore, I will next describe the improved pressure means for imparting this advancing thrust to the load of the carrier, and I will also describe the manner in which the load pressure means is actuated.

Slide blocks 102, at opposite sides of the path of the lumber carrier, are slidable in guides 103 which extend horizontally and preferably above the carrier. Hangers 104, depending from the slide blocks 102, on the inside faces thereof, coact with the plates 105 to hold the slide blocks 102 in their guides 103. A pressure beam carrier 106 is mounted on said hangers and extends across the transfer tracks so as to take up a position behind the lumber carrier and be advanced against the load carried thereby.

It is a feature of my load pressure means to provide adjustability, the importance of which over ordinary adjustability, will presently appear.

Referring more particularly to Figs. 4, 5 and 6, two bearing fittings 107 are shown mounted upon the pressure beam carrier 106, and slidable upon the front ends of said fittings is a pressure beam 108 which may be in the form of a channel iron. An adjusting bar 109 is fixed to said channel iron 108 at 110 and extends through a guide 111. The adjusting bar 109 has threaded connection at 112, with an adjusting screw 113, the latter being journaled in bearings 114 and 115, in said fittings. Each adjusting screw 113 extends through its bearing 115 and is provided with a reduced end on which a sprocket wheel or like sheave may be mounted. On one adjusting screw 113 I mount a sprocket wheel 116 and upon the adjusting screw of the other fitting I mount a sprocket wheel 117. A sprocket chain 118 is trained about said sprocket wheels 116 and 117 and over an idler sprocket 119, the remainder of the chain being trained about an actuating adjusting sprocket 120. The actuating adjusting sprocket 120 is mounted in an adjusting bar 121, which is in fact a tension bar, and which is adjustably mounted by means indicated at 122, with a depending support 123, mounted upon beam 106. A crank 124 provides means to operate the sprocket 120 so as to rotate the adjusting screws 113, of both fittings, in unison. It will now be seen that as crank 124 is rotated in one or the other of two directions, the pressure beam 108 will be retracted or projected with respect to its carrier 106, one adjustment being shown in Fig. 6. The forward or projecting edge of the pressure beam 108 is adapted for engagement with the load of the lumber carrier, preferably by engagement directly against the stakes 78. I will next describe the manner in which my improved cable operating means serves to actuate the load pressure means.

To one end of each slide block 102 is adjustably mounted, at 125, a cable 126 which is reeved or trained over an idler 127, at one extremity of the travel of the lumber carrier, which is the retracted extremity. From sheave 127 the cable 126 is trained over an idler 128 which forms one portion of an improved cable take-up. Idler 29 is mounted upon a weighted take-up rod 130 which is linearly movable in suitable guides 131, one only being shown. If desired, a weight 132 may be mounted upon the rod 130 so as to insure gravity movement of the rod 130 to take up slack in the cable 126, for a purpose which will presently appear.

From take-up idler 129 cable 126 is trained about an idler 133 and downwardly therefrom to drum 134, shown in Fig. 10.

A cable 135 is adjustably connected at 136 with the other end of said slide block 102 and is reeved about an idler sheave 137. From idler 137 the cable 135 is trained about an idler 138 from whence it is trained downwardly and is provided with a weight 139 which is slidable vertically in a casing 140. The weight 139 consists of suitable individual weights which may be increased or decreased as desired. Furthermore, as the weight 139 descends, I provide means for gradually decreasing the action of said weight.

An abutment 141 is mounted upon cable 135 and carries two weights 142. Stops 143, mounted on the interior or casing 140, serve to arrest weights 142 before the main weight 139 reaches a final point of descent. On upward movement of the weight 139, it may be desired to increase the leverage action of said weight and therefore the supplemental weights 142 would be carried upwardly, as will now be clear.

Referring to Figs. 3 and 10, it will be noted that when friction wheel 94 is engaged with driving friction wheel 95, then drum 124 will be rotated in a clockwise direction with reference to Fig. 3, and this will serve to retract guide blocks 102 and the load pressure means to the left of Fig. 3. This action will also elevate weight 139 so that when the pressure means is at the left of Fig. 3, the weight will be energized to descend, when released, so that the weight mechanism will draw the pressure means to the right of Fig. 3. Therefore it will now be clear that I have provided unitary power mechanism for retracting the car 74 and the load pressure means, in unison, to a starting position, and it will also be clear that I have provided independent weight mechanism for imparting a constant advancing thrust on the part of the load pressure means to the right of Fig. 3, and toward and during the unloading operation.

Movement of the pressure means to the right of Fig. 3, or toward an unloading position, is limited by stops 144, and therefore, the total movement of the load pressure means is not equal to the total movement of the lumber carrying structure, or in other words, is not equal in either direction to the distance between tracks 72 and 76, with which the transfer car must be brought into registry at either extreme of its travel.

Therefore while I have provided mechanisms for advancing the lumber carrier and the pressure means toward and during an unloading position, in unison, and also retracting these two devices to a starting position, it is, in accordance with the present invention, necessary to provide for some differential movement whereby the transfer car may travel at a greater distance than the load pressure means, and this feature I will now take up and describe in detail.

When the transfer car reaches such a position that its track sections 76 are in registry with incoming transport rails 72, under power retraction, then it is desirable to lock said transfer car 74 in such a position until the lumber carrier is rolled onto the transfer car.

A bell crank lever 145, pivoted at 146, is provided with an arm 147 having a substantially V-shaped notch 148. Said notch 148 is adapted for engagement with flange 149 of transfer car 74. When car 74 is in registry with incoming tracks 72, it is desired to lock car 74 in such position. Therefore bell crank lever 145 is connected with a rod 151 which latter is connected with bell crank 152, pivoted at 153. A foot treadle rod 155 is pivoted at 154 to bell crank 152 and extends up through the floor of the mill. Therefore when the car 74 reaches a position in registry with tracks 72, the operator will depress rod 155 and this will throw the bell crank 104 into a position to engage notch 148 with flange 149. The thrust on car 74 under the action of its weight on cable 99, will hold the flange 149 in engagement with the stop 148. When it is desired to release the car, the power mechanism may be actuated to move the car 74, slightly to the left of Fig. 1, and then the weight of the locking device will cause the latter to release the car 74 and the latter will be movable to the right of Fig. 1 under its weight mechanism.

Now assuming that transfer car 74 is in registry with incoming transport tracks 72, then it will be seen that the loaded carrier is in a position to be advanced onto transfer car 74 from transport tracks 72. It will be noted that when transfer car 74 has been moved into registry with transport rail 72, the pressure beam carrier, with its pressure beam, 108, will also have been moved into a starting position as shown in Fig. 1. However, before the carrier has been moved onto transfer car 74, pressure beam 108 will have been retracted on its carrier 106 to a position substantially flush therewith, by turning crank 124. This will provide for a clearance for the carrier to freely roll onto the transfer car 74 without being in engagement with the pressure beam 108 or its carrier 106. However, after the carrier has been moved onto the truck 74, then crank 124 will be rotated to advance pressure beam 108 into firm engagement with the rear stakes 78, as shown in Fig. 1.

Assuming now that the load is ready to be advanced toward the unloader, lever 93 will be shifted to free wheel 94, from wheel 95, and the weights will act upon cables 95, and 135 to draw the car 74 and its load, 99 and 135, and also the load pressure means, to the right of Fig. 3. While this is being done, the drum structure will be rotated in a contra-clockwise direction. When the lumber carrier has been advanced by the transfer car 74 until the first tier of lumber engages the guides 13 of the skids 12, then the pressure will be such that the front stakes 78 may be removed because the front stakes will be out of registry, or in staggering relation with respect to the skids 12 and may be removed by hand. The clutch 29 will be operated to start the chains 23 and the operation of unloading will proceed, as hereinbefore described, with the successive tiers being elevated and the stickers being removed as each tier is elevated, by hand. As the stickers are removed they are placed in the sticker carrier comprising arms 50. Now during removal of each successive tier of lumber, the cables will be imparting a constant and advancing thrust on both the pressure means for the load, and the carrier, in such a manner as to keep the load in firm engagement against the guides 13 until the last tier to the left of the carrier in Fig. 1, has come into engagement with the guides 13. At this point in the operation, I provide an automatic stop so that the advancing movement of the carrier to the right of Fig. 1, may be arrested immediately before the last tier of lumber has been lifted so that the rear stakes 78 can be removed to permit the carrier to advance beneath and forwardly of the unstacker.

As illustrated, the improved automatic stop mechanism which I will now describe may be termed, an intermediate stop mechanism, to distinguish the same from the initial stop mechanism which includes the lever 145. Thus my intermediate stop mechanism includes a lever 156 which is pivotally mounted at 157. The upper or free ends of the lever 156 is provided with a pin 158 and also with a slot 159. The stop dog 160 is provided with teeth 161 for adjustment with respect to the pin 158, and also with a pin 162 for longitudinal adjustment in the slot 159. The lever 156 is connected by link 163 with a bell crank 164, pivoted at 165. To the bell crank 165 is connected a foot treadle rod 166 which projects up through the floor of the mill in such a position that when it is depressed by the foot of the operator, the dog 160 will be moved out of an engaging position with respect to the flange 149. However, normally, the dog 160 is in a position to engage the flange 149 so that when the unloading operation reaches a point where the last tiers are about to be lifted, the dog 160 automatically arrests further movement of the car 74 so that after the last tier has been lifted then the rear stakes 78 may be removed. After the rear stakes have been removed, then pressure on 166 will depress dog 160, the latter hinging out of engagement with flange 149, so that the weight can advance the car 74 into the position shown in Fig. 3 so that the rail sections 76 will be in registry with the outgoing rail 73.

At this point, attention is directed to the fact that after the lumber has been unloaded, or when the last tier has been reached, then the load pressure means will have engaged the abutments 144 as shown in Fig. 3, so that further movement of the load pressure means is permanently arrested to the right of Fig. 3.

It may also be important to suggest, at this point, that the adjustability afforded by the teeth 161 is to vary the point of intermediate arrest of the car 74, in accordance with the thickness of lumber being unloaded. It will be obvious that with varying thicknesses of lumber, and because of certain irregularities in synchronic action of the apparatus, a slight adjustment may be desirable in order to arrest the car 74 at the desired point.

Now I have described the apparatus to the point where the car 74 is in registry with rails 73, the empty carrier being in position to be run off from car 74 onto rails 73, on the wheel of the independent truck units 77. It will be remembered that the front and rear stakes have been removed and they have been placed upon the empty carrier and the latter is immediately below the arms 50, of the sticker holder. A chain is wrapped about the stickers held by arms 50, and the hand grip 59, is then grasped by the hand of the operator to release the locking rod 66, in Fig. 9, so that the arms 50 can dump the stickers upon the empty carrier. The chain serves to prevent the stickers from spreading and falling off from the empty carrier. After the stickers and stakes have been deposited upon the empty carrier, then the latter is loaded sufficiently so that its separate and independent truck units 77 will be maintained at a certain distance apart, approximately their original distance, even after they are unlocked from the car 74. Thus the carrier with its stickers and stakes is ready to be rolled off from the car 74, onto the track 73, and up to the loader, as more particularly set forth in copending application filed September 2d, 1915, Serial Number 48,662.

At this point, I desire to assert that I believe that I am the first inventor to provide means whereby a lumber carrier in a loaded condition, may be rolled onto a transfer car, and advanced with the transfer car toward, and past, through or underneath an unloader, to take off the load; and then finally to move the transfer car into registry with transport tracks and run the empty carrier, on its own wheels, off from the transfer car onto the transport tracks.

I will next finish the cycle of operation which consists in returning the car 74 and the load pressure means to a starting position, to the left of Fig. 3, and I will now explain the differential action and cable tightener which permits of this operation.

It will be seen by reference to Fig. 1, that while the pressure means and the lumber carrying structures are moving through the unloading operation and to the right of Fig. 1, that the take-up rod 130 is in an uppermost position and the slack is all taken out of the cable 126. However, when the pressure means reaches the abutments 144, and as the car 74 continues in its travel up to the final position shown in Fig. 3, being arrested in this position by the fact that its weight has reached the bottom of its travel, the drum structure on shaft 87 has continued to rotate even though the pressure means has been brought to a position of rest. This continuance of rotation of the drums 134, 98 and 83, under the action of the weight on cable 99, causes a slack in cable 126, and the take-up 130 takes up this slack by moving downwardly from the position shown in Fig. 1, to the position shown in Fig. 3. On the contrary, on retractive movement of the car 74 and the carrier 106 to the left of Fig. 3, under power drive, it will be seen that clockwise rotation of shaft 88 will advance the carrier 74 to the left of Fig. 3, some considerable distance, before the pressure beam carrier 106 is advanced. This difference of movement will be caused by the fact that the rod 130 will be elevated because it is lighter than the frictional resistance on the blocks 102. After the take-up has been effected, then continued rotation of shaft 88 will retract transfer car 74 and pressure beam carrier 106, in unison, to a starting position.

Reference will next be made to my improved truck units which are shown more particularly in Figs. 11, 12 and 13, in addition to the showing thereof in Figs. 1 and 2.

It is desired to point out that heretofore lumber carriers have been formed of made up units, or sub-units, the independent units being unstable on their own wheels and incapable of carrying the load unless the several units were connected together. This construction followed prior forms of lumber handling apparatus where the sub-units were knocked down, after being unloaded, and carried or hauled back to the loader.

In accordance with my construction, each truck unit is at all times stable and capable of holding upright, irrespective of any other units. Furthermore, it is a feature of novelty of my invention to form each truck unit of two end frames each having two bearing or rolling wheels, the end frames being loosely connected with a transversely disposed bolster. In addition to this feature, the bearing or rolling wheels of my truck units are flanged on opposite sides so that notwithstanding the fact that the transversely connected bolsters are loosely united with the end truck frames, still, the truck units can not roll off from the tracks because of the double flanges on the wheels.

Referring more particularly to the specific construction shown, 169 indicates the transversely disposed bolsters which are shown formed of parallel channel irons. Said channel irons are rigidly connected, as indicated in Fig. 11, by U-shaped connectors 170, which may also perform the function of a socket for the stakes 78, although I do not wish to be limited to this exact means, as the manner of connecting the channel irons 169 is not specifically a feature of my invention. The essential thing is, that the end frames be loosely connected by a rigid bolster. The end wheel frames are designated as a whole at 171 and the sides thereof may be formed of flanged iron 172 suitably connected at their ends, as indicated at 173. Each end frame is provided with two carrying or rolling wheels 174 which may be suitably journaled in any desired manner in the flange sides 172, as indicated in Fig. 12. As illustrated, a cotter pinned journal 175 extends through the sides 172 for journaling each of the wheels 174.

Midway of each end frame 171 is a suitable saddle 176 which is bolted to the flanges of the side members in a manner indicated at 177. Through said saddle extend bolts 178 which project through slots 179 in the lower flanges 180 of the channels 169. This arrangement provides for a loose connection between the end frames and the transversely disposed bolster so that there will be a certain give or freedom of play between the end frames of the truck units thereby preventing them from locking or working on the tracks. If it were not for this free play, the carriers would wedge on the tracks, when loaded, especially when taking them out of the kiln or going to or from the kiln. This is directly the result of having the independent units unconnected with each other, that is all of the units forming a single carrier, the advantage of which is clearly set forth in my co-pending application hereinbefore identified. Thus it will be seen that I overcome any disadvantage in having all the truck units free and independent of each other and at the same time I gain all the advantages of contracting of the truck units into limited space without knocking down the truck units. I wish to again assert that it is of the most essential importance to avoid knocking down of the truck units and bodily carrying the latter and their bolsters unconnected, from the unloader to the loader.

I will next refer to the novel construction of the wheel peripheries with which the wheels of my improved trucks are provided.

It will be seen that each wheel 174 is provided with a flat rail tread engaging periphery 181 which is shown divided by a substantially V-shaped groove 182 into two laterally disposed annular track sections. The wheel is also provided with lateral annular flanges 183 which are adapted to extend on opposite sides of tracks 184. These tracks have a width of tread which substantially takes up the space between the flanges 183.

Now in my improved trackage lumber handling case, hereinbefore identified, I have described transport tracks having knock down sections so that the sections could be shifted or transferred from the transport tracks to the transfer cars. The knock down sections of the transport tracks were for the purpose of enabling the transfer cars to be advanced into the spaces formed by said knock down sections. In Fig. 13, I have illustrated a knock down section at 185 which is considerably narrower than the tread of rail 184. Furthermore, this knock down section 185 is provided with a V-shaped tread portion 186 which, at its juncture with rail 184, projects somewhat above the tread of the latter. Now in Fig. 13, I have clearly illustrated how the flanges 183 will be in engagement with the rail 184, or rather the head thereof, so as to insure registry of the groove 182 with the V-shaped tread 186 of the knock down rail 185. In either direction in which the unit is moved, the flanges will coöperate with the V-shaped groove or the V-shaped groove will coöperate with the flanges in such a manner as to insure absolute registry so that the truck units will freely and accurately run from the transport tracks onto the knock down rail sections, or vice versa. I have not particularized the juncture of the knocked down rail 185 with the rail 184, in Fig. 13, because of the fact that the construction is clearly shown in my co-pending case.

Now it will be seen that by reason of the fact that the end frames are loosely connected with the bolsters, it is of the utmost importance when the truck units are running from one rail of one cross section, to another rail of a different cross section, to provide means for guiding the truck units so that the wheels of the end frames will accurately register from one rail to the other and will be held in practical alinement with the rails.

It is believed that the advantages and utility of my invention will be fully understood from the foregoing description, and while I have herein shown and described one specific form of my invention I do not wish to be limited thereto except for such limitations as the claims may import.

I claim:—

1. In a mechanism for unloading edge stacked lumber, an upright unloader including tier lifters, a carrier for the edge stacked lumber movable toward said unloader to abut the load against said unloader and movable past said unloader as the load is being removed, a pressure bar carrier movable toward the upper portion of the load as the latter is being advanced, and a pressure bar adjustable on said bar carrier to exert thrust on the upper part of the load as the latter is advanced, in a direction toward said unloader, substantially as described.

2. In a mechanism for unloading lumber, an unloader, a lumber carrier, a cable having its ends connected with opposite sides of said carrier, an idler at one limit of travel of said carrier about which one bight of said cable is trained, a drum structure at the other limit of travel of said carrier about which said cable is trained, a weight controlled cable trained about said drum structure to be reeved in and elevate said weight when said drum structure is turned to advance said carrier in one direction, whereby said weight will lower to advance the carrier in an opposite direction, substantially as described.

3. In a mechanism for unloading lumber, an unloader, a lumber carrier movable in opposite directions from opposite sides of said unloader, cable means for advancing said carrier in opposite directions, pressure means for exerting stress on the load of said carrier, cable means for advancing said pressure means in opposite directions, weight mechanism for actuating said cable means of said carrier and pressure means to exert a sustained advancing thrust on said carrier and the load thereof in unison toward said unloader, a power mechanism for retracting said carrier and pressure means away from said unloader in unison and energizing said weight mechanism, substantially as described.

4. In a mechanism for unloading lumber, an unloader, a lumber carrier movable in opposite directions with respect to said unloader, pressure means for exerting thrust on the load of said carrier, cable mechanism for actuating said carrier and pressure means in opposite directions, weight mechanism for actuating said cable means to exert a sustained advancing thrust on said carrier and pressure means to advance the carrier and its load toward said unloader as the load is being removed, and power mechanism for retracting said carrier and pressure means away from said unloader in unison and energizing said weight mechanism, substantially as described.

5. In a mechanism for unloading lumber, an unloader, a lumber carrier movable in opposite directions from opposite sides of said unloader, load pressure means movable in opposite directions away from and up to said unloader but not past said unloader, a unitary cable drum structure, sets of cables one for said carrier and one for said pressure means connected to said drum structure, weight mechanism actuating said sets of cables to impart a sustained advancing thrust to move said carrier toward and past and the load of said carrier against said unloader during the unloading operation and advance said carrier beyond said unloader after the loader has been removed, with said drum structure rotating wholly in one direction, and power mechanism for connection with said drum structure for rotating the same in an opposite direction to energize said weight mechanism and first retract said carrier up to said pressure means and then move said carrier and pressure means in unison away from said unloader, substantially as described.

6. In combination, an unloader, transport tracks, transfer trackage extending past said loader and abreast of said transport tracks, a transfer car movable on said transfer trackage past said unloader and into registry with said transport tracks, a carrier for the load of lumber movable on said transport tracks onto said transfer car, means exerting a constant advancing thrust on said transfer car to hold the latter and said carrier with its load against said unloader and to move said transfer car past said unloader, an initial stop mechanism for locking said transfer car in registry with said transport tracks, and an intermediate stop mechanism for arresting said transfer car at an intermediate point of its travel and at a predetermined point just prior to the completion of the unloading operation, substantially as described.

7. In combination, an unloader, transfer trackage leading toward and past said unloader, a lumber carrying structure movable on said transfer trackage, means for imparting a constant advancing thrust on said structure to move the latter toward and past said unloader, and mechanism for automatically arresting said structure just prior to completion of the unloading operation, substantially as described.

8. In combination, an unloader, trackage, a lumber carrying structure movable on said trackage, means exerting a constant advancing thrust on said structure to advance the same toward and past said unloader, and adjustable mechanism for automatically arresting said structure just prior to completion of the unloading operation, substantially as described.

9. In combination, an unloader, outgoing transport tracks, transfer tracks leading past said unloader and abreast of said transport tracks, a transfer car movable on said transfer trackage, a lumber carrier movable on and with said transfer car toward and gradually underneath and past said unloader as the carrier is unloaded and with said transfer car into a final position to be run onto said transport tracks, and a sticker holding and dumping mechanism adapted to receive the stickers while said carrier is being unloaded and being disposed in a position to dump the stickers onto said empty carrier when the latter is in a position to be run onto said transport tracks, substantially as described.

10. An unloader comprising in combination, an upright frame structure including loosely mounted skids, lifter chain guides on said skids for engagement with the load of lumber, chains movable in said guides and provided with lumber tier lifters, an adjusting beam engaging said skids to hold the latter toward the load, and means for adjusting either end of said pressure beam to distort the unloader from its true planes to insure engagement of said guides with said load, substantially as described.

11. In a mechanism for unloading edge stacked lumber, an unloader, a carrier for the edge stacked lumber movable toward said unloader to abut the load against said unloader and movable past said unloader as the load is being removed, a pressure bar carrier movable toward the load of said carrier as the latter is being advanced, and a pressure bar adjustable on said bar carrier to exert thrust on said load as the latter is advanced toward said unloader, substantially as described.

12. In a mechanism for unloading edge stacked lumber, an unloader, a pressure bar carrier movable toward the load of said carrier, and a pressure bar adjustable on said bar carrier to exert thrust on the load as the latter is advanced toward said carrier, substantially as described.

13. In a mechanism for unloading edge stacked lumber, an unloader, a lumber carrying structure, movable with its load toward and into load engagement against said unloader, cable means for advancing said lumber carrying structure in opposite direction to opposite sides of said unloader, a drum structure for operating said cable means for retracting said structure to a starting position, means for exerting pressure on the load of said carrying structure and movable toward one side of said unloader and up to but not beyond said side, a weight actuated cable for advancing said pressure means against said load and along therewith to an unloading position, a retracting cable actuated by said drum structure for retracting said means to a starting position and having an excess length, gravity means for normally taking up said excess length to delay retractive movement of said pressure means, power means for actuating said drum structure to retract said carrying structure toward a starting position and then retract said pressure means and carrying means in unison to a final starting position after the slack has been taken up from said pressure means retracting cable, and a weight connected with said drum structure for operating the latter to advance said carrier structure toward said unloader, substantially as described.

14. In a mechanism for unloading edge stacked lumber, an upright unloader, means for holding a load of edge stacked lumber against said unloader, said unloader having means for successively lifting tiers of lumber above the load, and tension members engaging said tiers as the latter rise above the load to hold the separate boards against said lifters, said tension members having sticker stops for preventing elevation of the stickers above a predetermined point, substantially as described.

In testimony whereof I affix my signature in presence of two witnesses.

DANIEL R. TANNER.

Witnesses:
 NELLIE HILLS,
 C. H. FINN.